United States Patent
Casini

(10) Patent No.: US 10,766,519 B2
(45) Date of Patent: Sep. 8, 2020

(54) STEERING COLUMN

(71) Applicant: MMX—MECCANOPLAST S.R.L., Reggio Emilia (IT)

(72) Inventor: Massimiliano Casini, Reggio Emilia (IT)

(73) Assignee: MMX—MECCANOPLAST S.R.L., Reggio Emilia (IT)

( * ) Notice: Subject to any disclaimer, the term of this patent is extended or adjusted under 35 U.S.C. 154(b) by 164 days.

(21) Appl. No.: 15/773,105

(22) PCT Filed: Nov. 3, 2016

(86) PCT No.: PCT/IB2016/056610
§ 371 (c)(1),
(2) Date: May 2, 2018

(87) PCT Pub. No.: WO2017/077472
PCT Pub. Date: May 11, 2017

(65) Prior Publication Data
US 2018/0319421 A1    Nov. 8, 2018

(30) Foreign Application Priority Data
Nov. 6, 2015  (IT) .................. 102015000069852

(51) Int. Cl.
*B62D 1/184* (2006.01)
*B62D 1/189* (2006.01)
*B62D 1/187* (2006.01)
*B62D 1/185* (2006.01)
*F16C 1/10* (2006.01)

(52) U.S. Cl.
CPC ............ *B62D 1/184* (2013.01); *B62D 1/189* (2013.01); *B62D 1/185* (2013.01); *B62D 1/187* (2013.01); *F16C 1/10* (2013.01)

(58) Field of Classification Search
CPC ........ B62D 1/184; B62D 1/187; B62D 1/189; B62D 1/185; F16C 1/10
See application file for complete search history.

(56) References Cited

U.S. PATENT DOCUMENTS

| 5,813,289 A | 9/1998 | Renick et al. |
| 2005/0183534 A1 | 8/2005 | Maida et al. |
| 2006/0082119 A1 | 4/2006 | Tinnin et al. |

(Continued)

FOREIGN PATENT DOCUMENTS

EP    1923297 A2    5/2008

*Primary Examiner* — Karen Beck
(74) *Attorney, Agent, or Firm* — Pearne & Gordon LLP

(57) ABSTRACT

A steering column (10), comprising: a base (20); an upper section (50) connected to the base (20), wherein the upper section (50) is movable relative to the base (20) with respect to at least two degrees of freedom; an actuation lever (60) connected to the upper section (50) and operable between a locked position, in which the actuation lever (60) is in stable equilibrium and constrains both degrees of freedom of the upper section (50) relative to the base (20), and two distinct unlocked positions, each of which respectively releases one of the two degrees of freedom of the upper section (50) relative to the base (20); wherein, in the two unlocked positions, the actuation lever (60) is located in two distinct respective stable equilibrium positions.

6 Claims, 9 Drawing Sheets

(56) References Cited

U.S. PATENT DOCUMENTS

| | | | |
|---|---|---|---|
| 2008/0150270 A1* | 6/2008 | Longo | B62D 1/184 280/775 |
| 2008/0238069 A1* | 10/2008 | Kumar | B62D 1/183 280/775 |
| 2019/0152509 A1* | 5/2019 | Casini | B62D 1/183 |

* cited by examiner

STEERING COLUMN

TECHNICAL FIELD

The present invention relates to a steering column for vehicles, for example for heavy-duty and/or agricultural vehicles.

BACKGROUND ART

There are known steering columns comprising a fixed base to which an upper section is connected from the upper end of which a top portion of a steering axle associated to a steering wheel protrudes.

The upper section, for example, can be associated in a movable manner relative to the base with respect to at least two degrees of freedom, for example one rotational and one translational, for the regulation of the steering wheel tilting and height, respectively.

Such steering columns of known type may have one or more control members, individually operable between a locked position, in which they constrain both degrees of freedom of the upper section relative to the base, and respective unlocked positions, in which they release one or both degrees of freedom of the upper section relative to the base.

For example, the simultaneous adjustment of the steering wheel is allowed in both functions (tilting and rotation) via a single control member which, once actuated, unlocks both movements or separate adjustment of both movements respectively with distinct control members, for example two levers, a lever and a pedal, a lever and a button, or even the separate adjustment of both movements with a single control member using different movements of the control member itself.

In this last case, the known steering columns have the requirement that the control member is to be manually retained in the respective unlocked positions during the manual adjustment of the tilting and/or height of the steering wheel.

Therefore, the driver, during adjustment of the steering wheel, has one hand always engaged on the control member and the other engaged on the steering wheel to bring it in the desired position.

As it is deducible, this mode of realizing the adjustment of the steering wheel is particularly uncomfortable for the driver who, during the adjustment, besides having to operate the steering wheel with one hand, is forced to assume the correct or usual driving position that would allow an optimal adjustment of the steering wheel, because forced to have a hand in correspondence to the control member.

One object of the present invention is to overcome the mentioned drawbacks of the prior art, within the context of a simple, rational and low-cost solution.

Such objects are achieved by the features of the invention reported in the independent claim. The dependent claims describe preferred and/or particularly advantageous aspects of the invention.

DISCLOSURE OF THE INVENTION

Particularly, the invention provides a steering column comprising:
a base;
an upper section connected to the base, wherein the upper section is movable relative to the base with respect to at least two degrees of freedom;
an actuation lever connected to the upper section and operable between a blocking position, in which the actuation lever is in stable equilibrium and binds both degrees of freedom of the upper section relative to the base, and two distinct unlocking positions, each of which respectively releases one of the two degrees of freedom of the upper section relative to the base;
wherein, in the two unlocked positions, the actuation lever is located in two distinct respective stable equilibrium positions.

Thanks to this solution, the driver can easily operate the actuation lever, release it in the desired unlocked position and then operate the steering wheel with both hands and orient it for adjusting the same in a comfortable and safe manner.

An aspect of the invention furthermore provides that, between the base and the upper section, an intermediate section can be interposed, the upper section is slidably connected to the intermediate section defining a degree of translational freedom of the upper section relative to the base.

Advantageously, between the upper section and the intermediate section, a frictional locking mechanism can be interposed, equipped with a control member selectively operable between a closed position, in which it stops the sliding of the upper section with respect to the intermediate section, and an open position, in which it releases the sliding of the upper section with respect to the intermediate section; also, the actuation lever can be connected to the control member for the actuation of the same selectively between the closed position and the open position, respectively in the locked position of the actuation lever and in a first position of the two unlocking positions of the same.

Thanks to this solution, the locking and unlocking of the sliding of the upper section relative to the intermediate section is particularly simple, convenient and intuitive for the driver.

Still for the same purposes illustrated above, the operating lever may be rotatably connected to the upper section with respect to a first axis of oscillation and comprise a cam with an eccentric profile relative to the first axis of oscillation and adapted to actuate the control member selectively between the closed position and the open position as a result of an oscillation of the cam with respect to the first axis of oscillation of a given angle of oscillation.

A further aspect of the invention provides that the intermediate section may be interposed between the base and the upper section, the intermediate section can be pivotally connected to the base defining a rotational degree of freedom of the upper section relative to the base.

Advantageously, the intermediate section can be hinged to the base with respect to an orthogonal axis of rotation to a sliding direction of the upper section with respect to the intermediate section.

Thanks to this, the steering wheel can be oriented and adjusted in proportion depending on the needs of the driver.

Preferably, between the intermediate section and the base, a gas spring can be connected, comprising:
a cylinder, hinged at one of the base and the intermediate section;
one stem slidably connected to the cylinder and hinged to the other of the intermediate section and the base; and
a control element selectively operable between a stop position, in which it stops the sliding of the stem relative to the cylinder, and an unlocked position, in which it releases the sliding of the stem relative to the cylinder; the actuation lever can be connected to the control element for the actuation of the same selectively between the locked position and the unlocked position, respectively in the locked position of the actuation lever and in a second position of the two unlocked positions of the same.

Thanks to this solution, the locking and unlocking of the rotation of the intermediate section (and therefore the upper section) relative to the base is particularly simple, convenient and intuitive for the driver.

Still for the same purposes illustrated above, the actuation lever may be rotatably connected to the upper section with respect to a second axis of oscillation and comprise at least an eccentric section with respect to the second axis of oscillation to which the control member is connected by a traction cable, for the actuation of the control member selectively between the stop position and the unlocked position as a result of an oscillation of the eccentric section with respect to the second axis of oscillation of a given angle of oscillation.

Preferably, the traction cable can comprise a sheathed Bowden type cable.

BRIEF DESCRIPTION OF THE DRAWINGS

Further features and advantages of the invention will become apparent from reading of the following description provided by way of example and not of limitation, with the help of the figures illustrated in the attached tables.

BEST MODE FOR CARRYING OUT THE INVENTION

Figure 1:
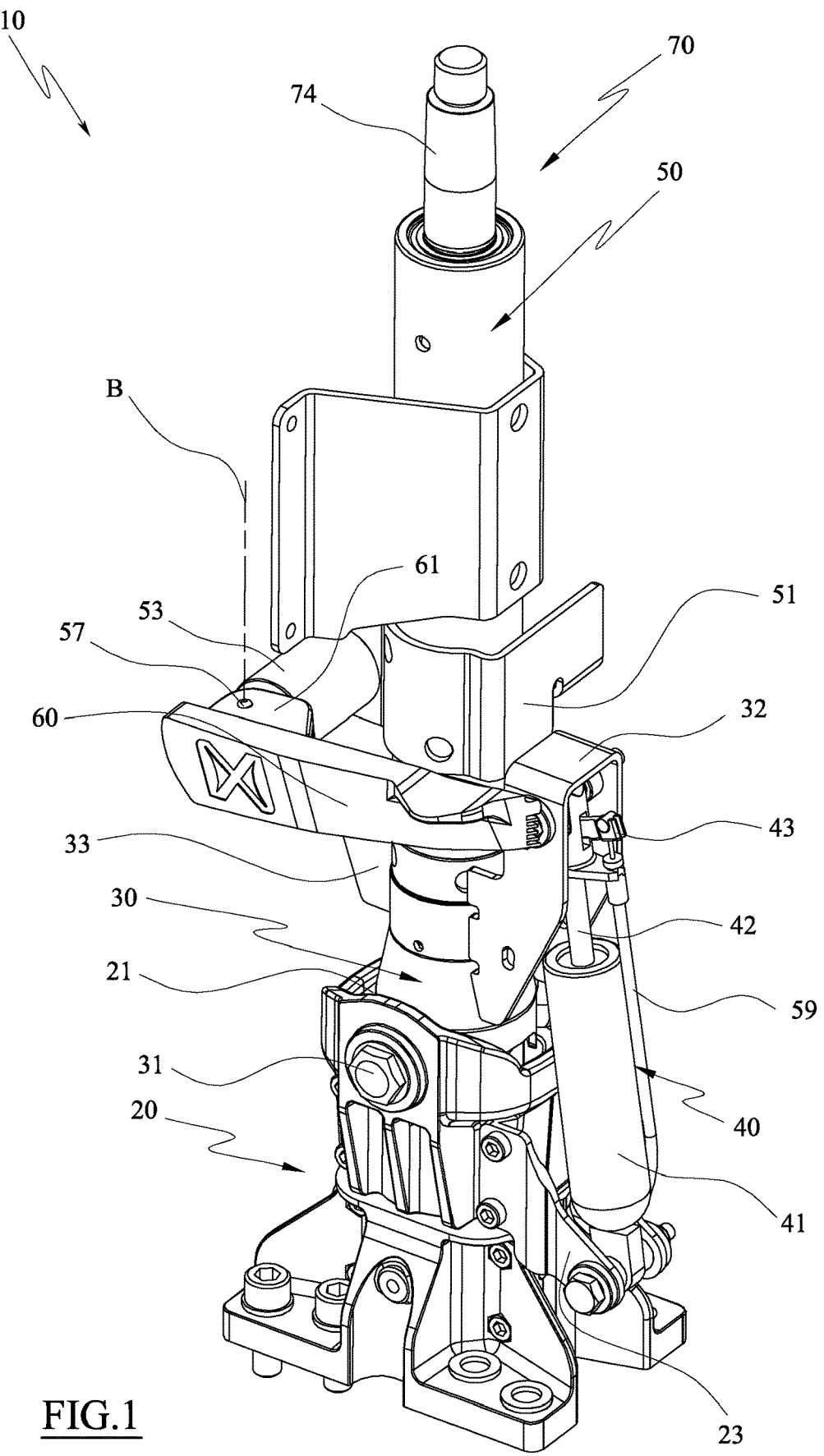
FIG. 1 is a front-side axonometric view of a steering column according to the invention.
Figure 2:
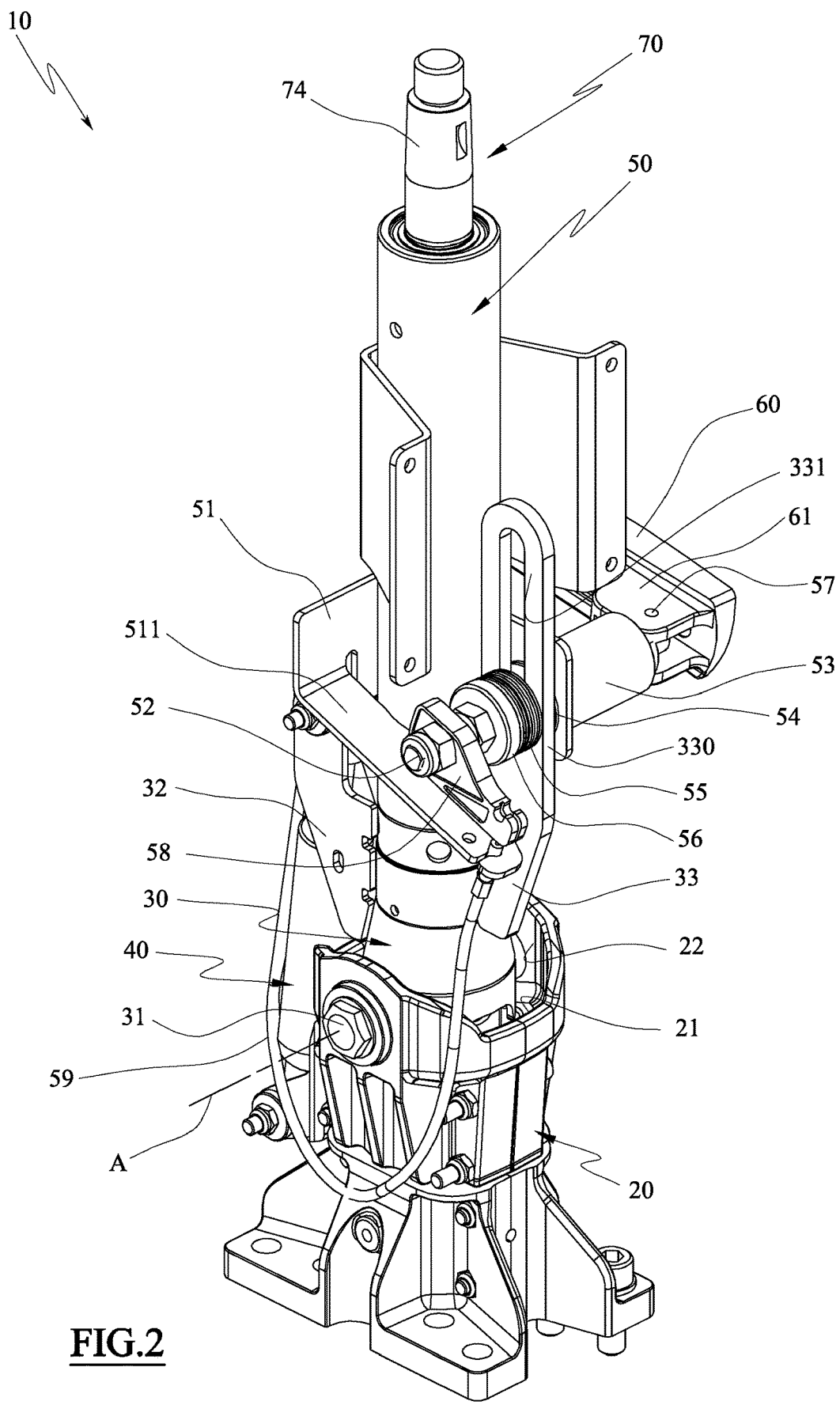
FIG. 2 is a back-side axonometric view of the steering column of FIG. 1.
Figure 3:
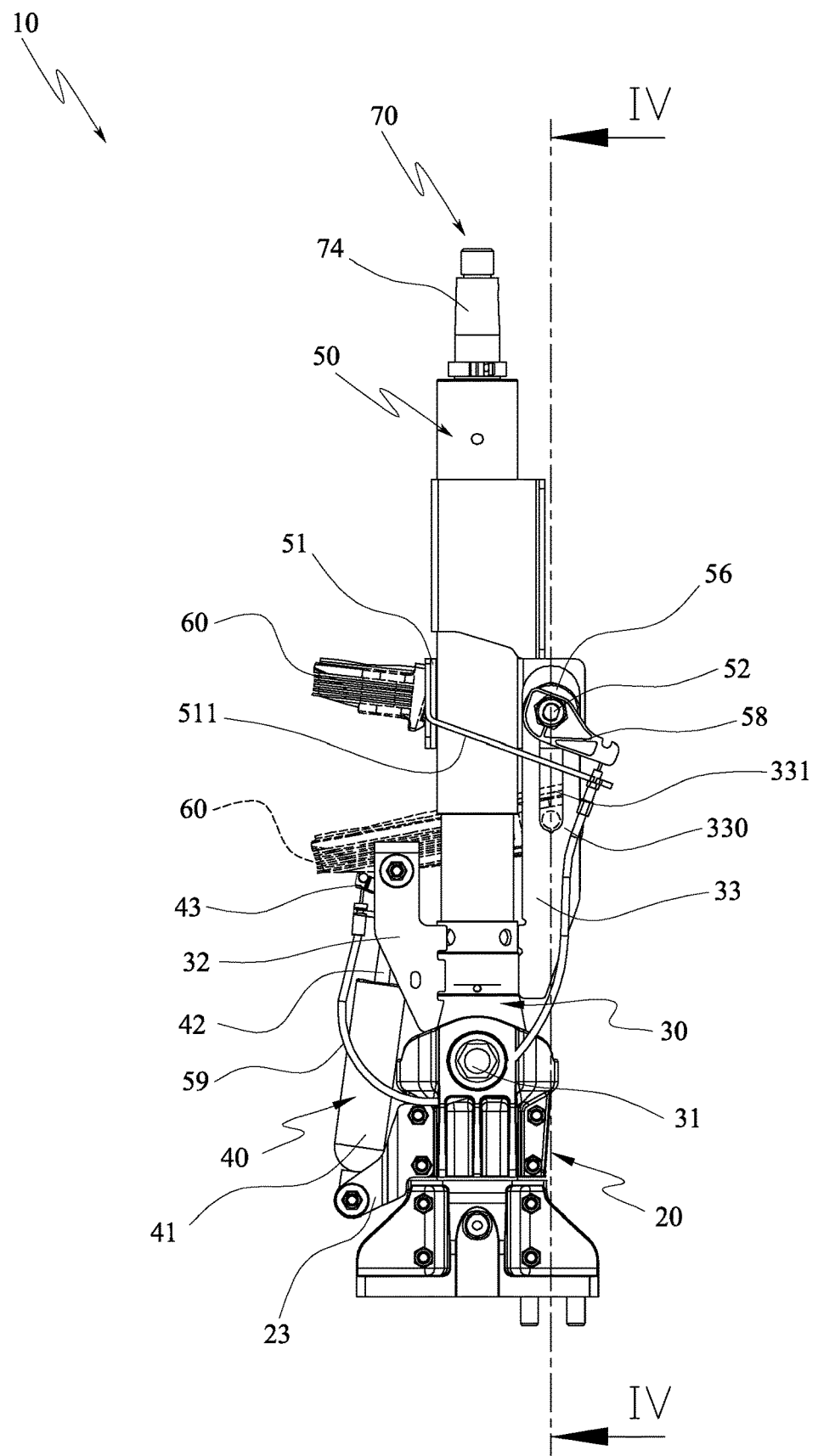
FIG. 3 is a side view of FIG. 1.
Figure 4:
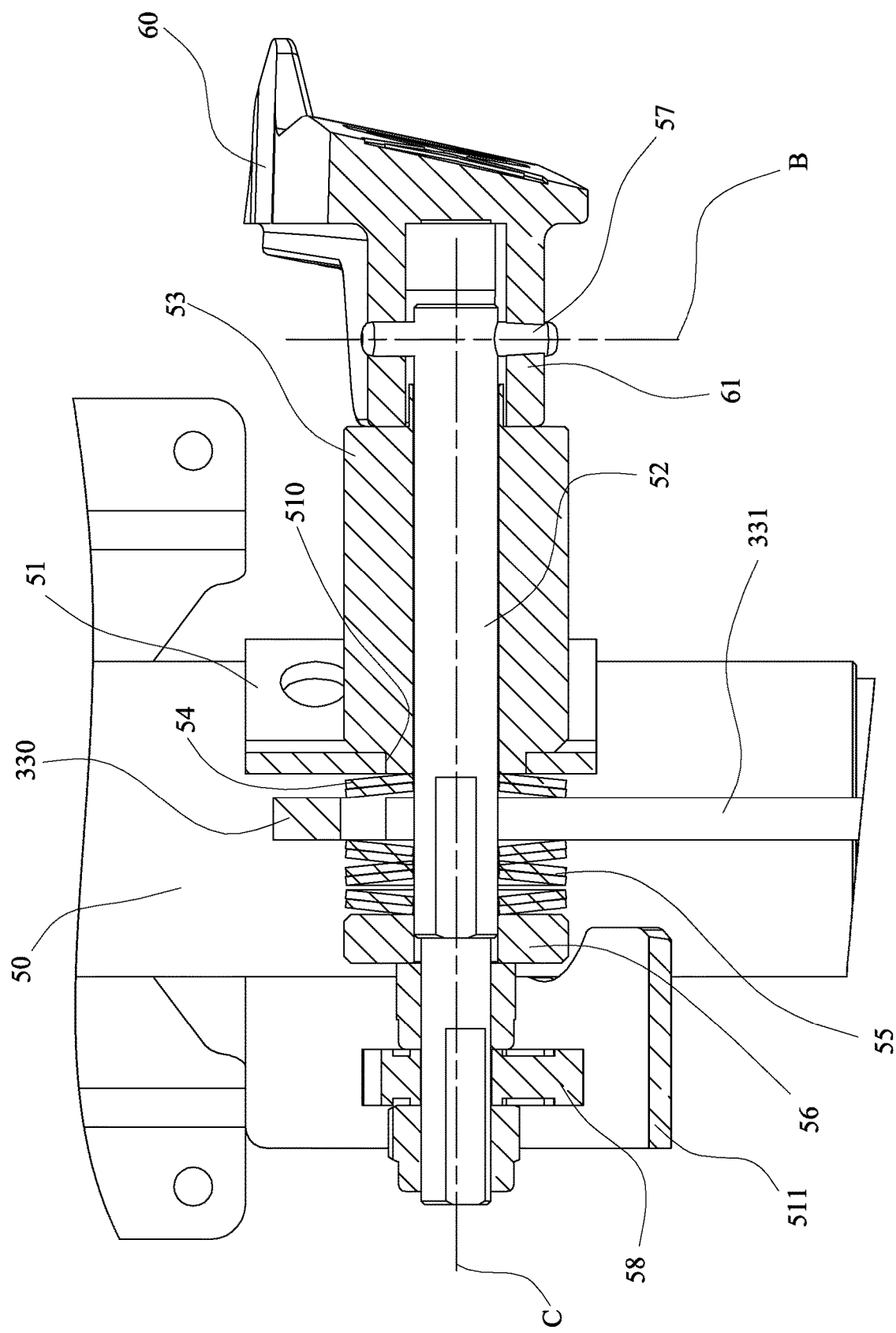
FIG. 4 is a sectional view taken along section line IV-IV of FIG. 3.
Figure 5:
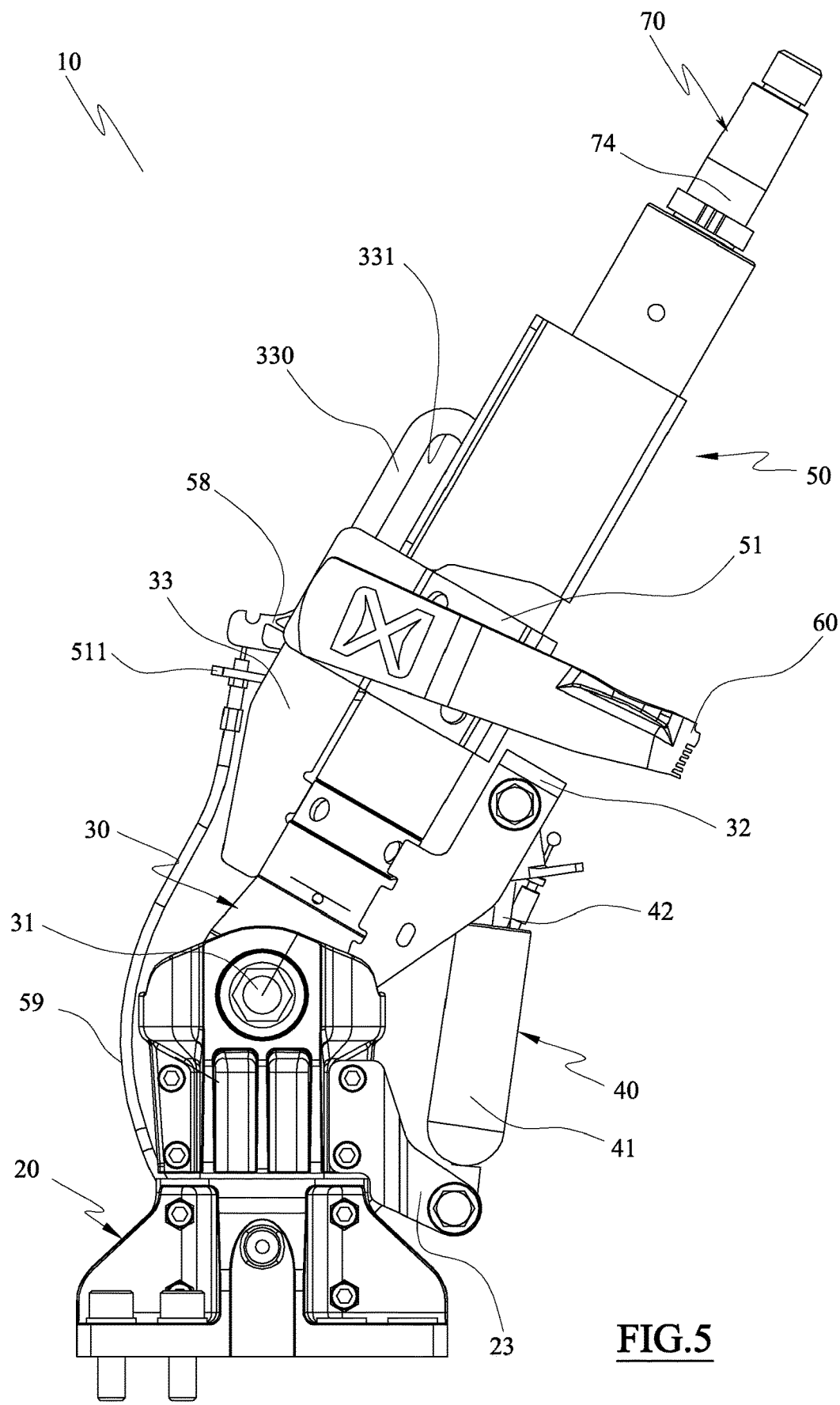
FIG. 5 is a side view of the steering column in a tilted and lowered configuration with respect to an axis of oscillation.
Figure 6:
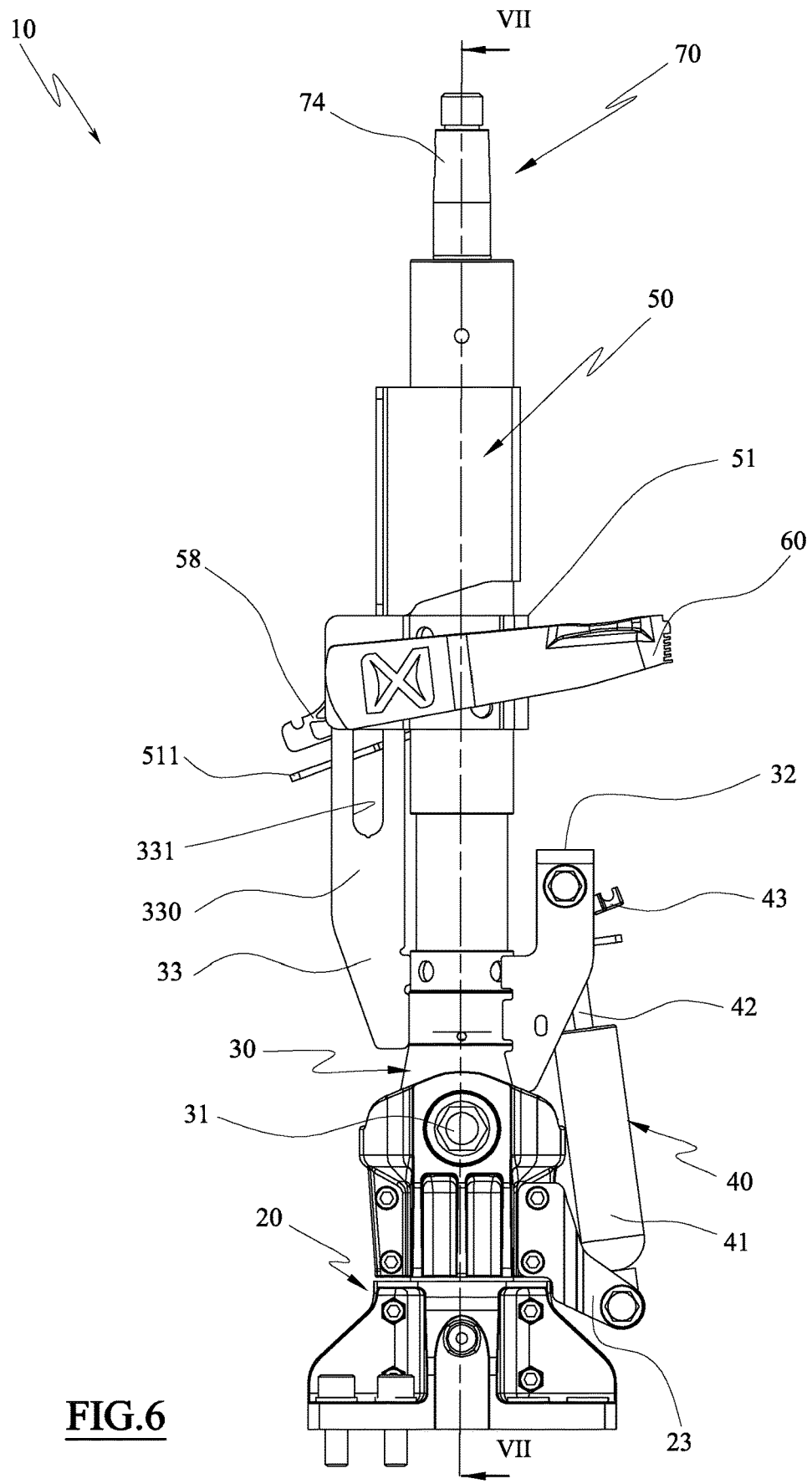
FIG. 6 is a side view of the steering column in a straight and raised configuration with respect to an axis of oscillation.
Figure 7:
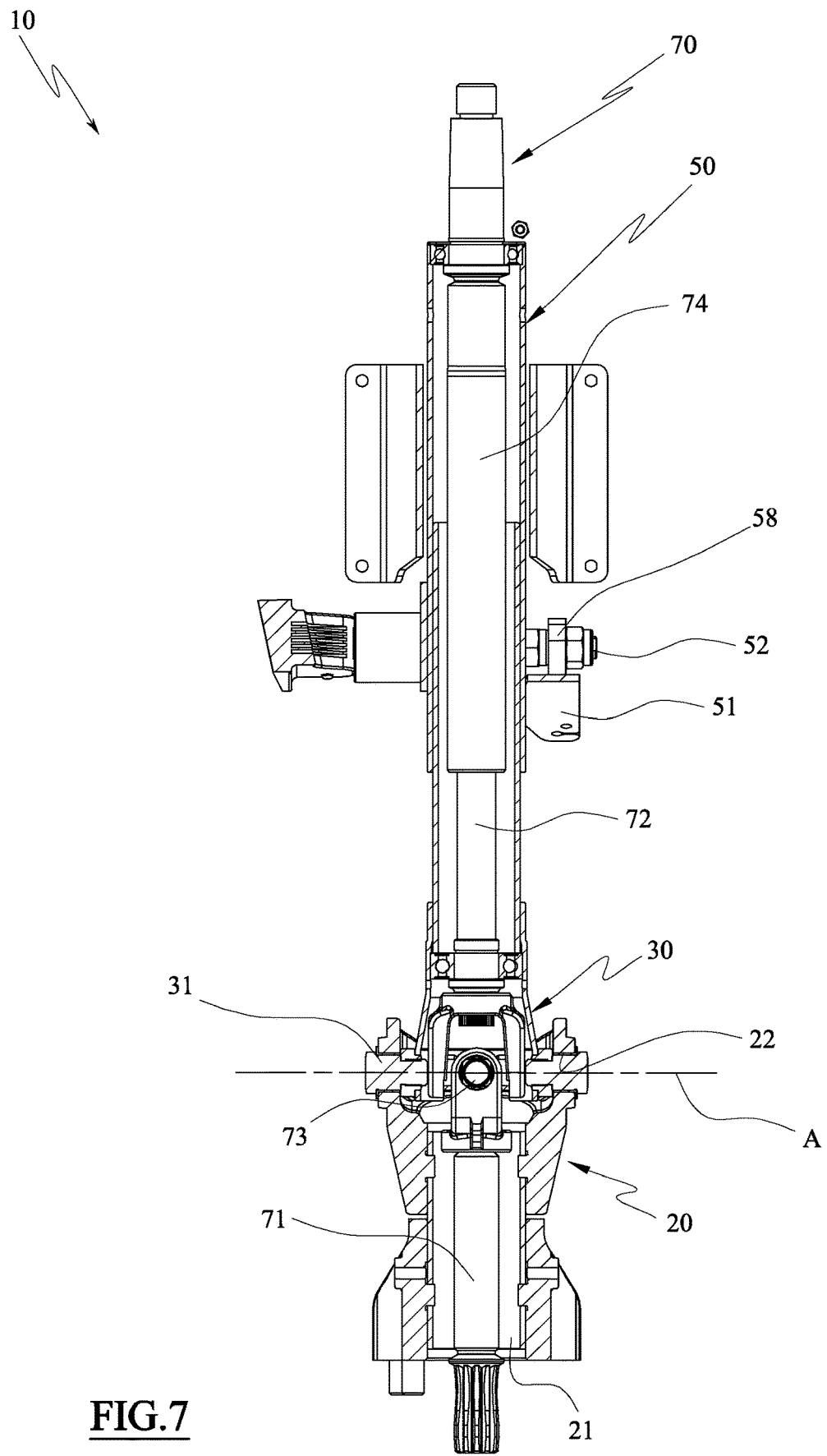
FIG. 7 is a sectional view taken along line VII-VII of FIG. 6.
Figure 8:
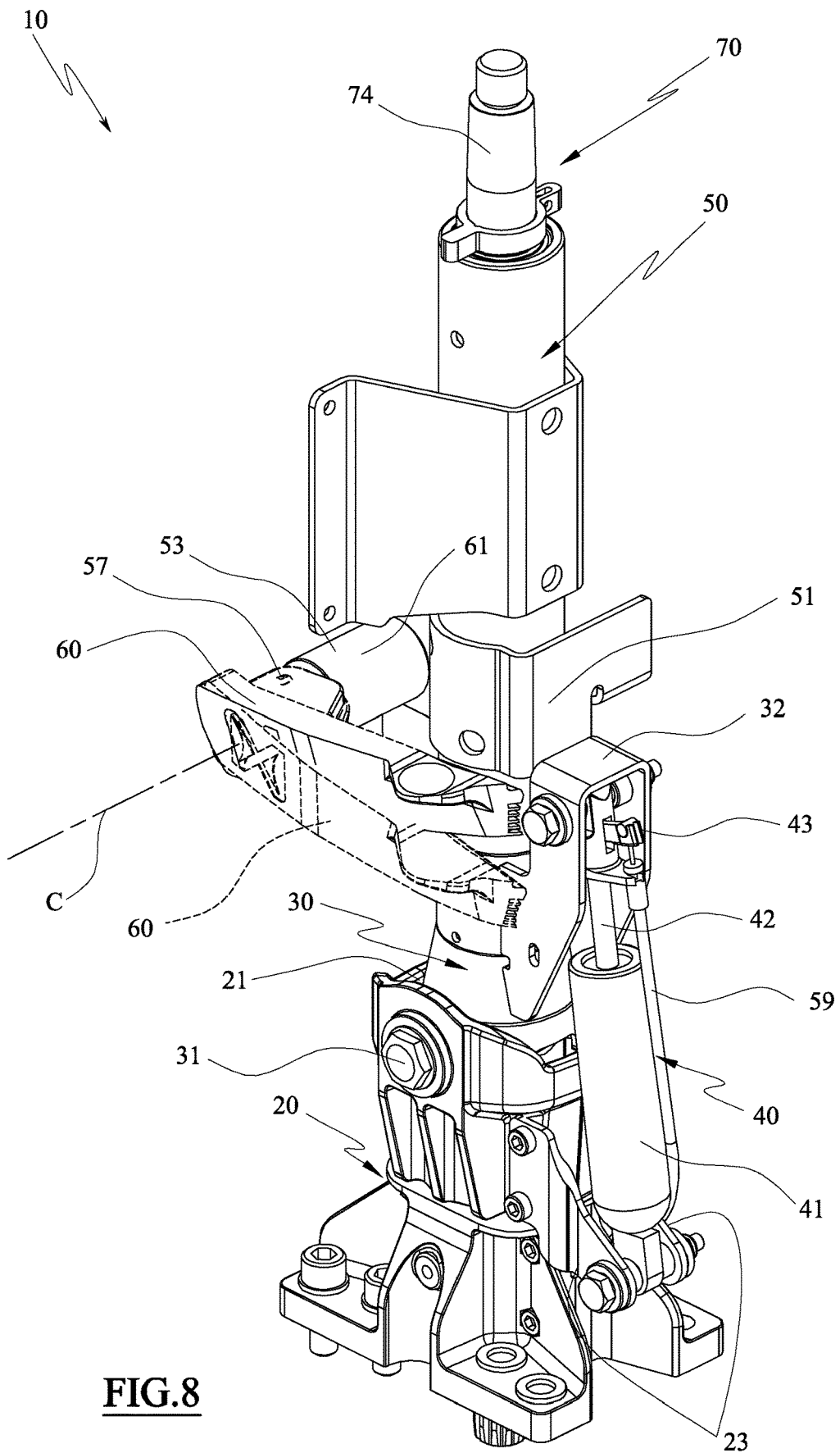
FIG. 8 is a front-side axonometric view of the steering column with the actuation lever in the locked position and a first unlocked position (in dashed lines) for the variation in tilting of the steering column.
Figure 9:
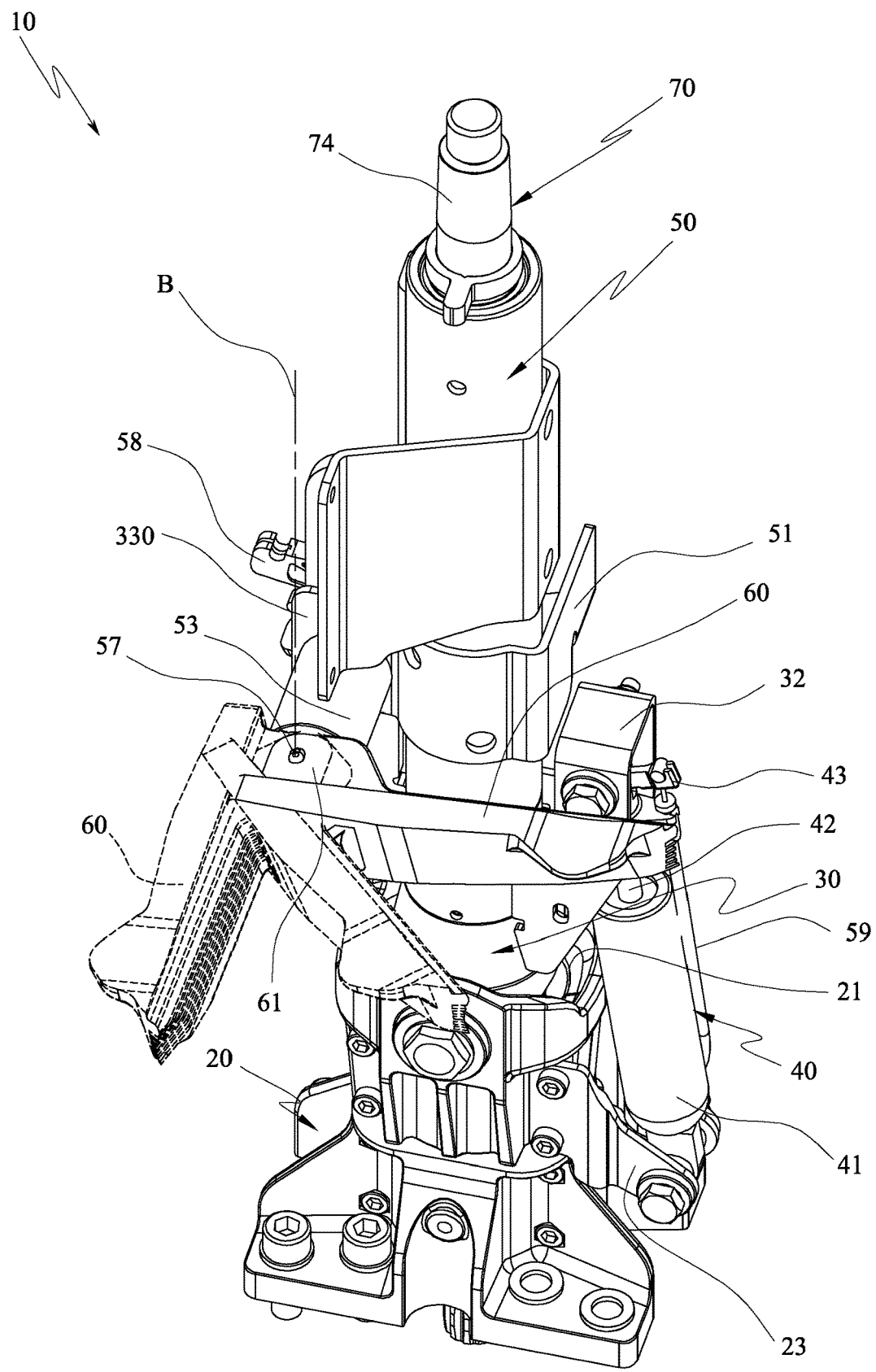
FIG. 9 is a front-side axonometric view of the steering column with the actuation lever in the locked position and a second unlocked position (in dashed lines) for the variation in height of the steering column.

With particular reference to such figures, 10 globally indicates a steering column for vehicles, for example heavy-duty vehicles such as agricultural vehicles.

The steering column 10 includes a base 20 which can be fixed, for example, by means of threaded members, to the vehicle.

The base 20, for example, is substantially hollow and comprises a cylindrical inner cavity 21, for example of the type of a cylindrical sleeve.

The base 20 may have different heights according to the requirements.

The base 20 comprises, for example, a cylindrical seat 22 transverse (for example perpendicular) to the axis of the cylindrical cavity 21.

For example, the cylindrical seat 22 is a through hole from side to side of the surface of base 20.

On the base 20, a first lug 23, for example protruding in a direction substantially radial outside of the same base, in a position in squareness with the cylindrical seat 22, is also formed.

The steering column 10 also comprises an intermediate section 30, which is connected to the base 20 with respect to a single rotational degree of freedom.

The intermediate section 30 for example comprises a substantially cylindrical body, for example with variable section along the axis (from a lower enlarged end to an upper tapered end).

The intermediate section 30 is for example substantially hollow and has a substantially cylindrical internal cavity.

In particular, the intermediate section 30 is hinged, for example in correspondence of its lower end, to the base 20 with respect to an axis of rotation A perpendicular to the axis of the cylindrical cavity 21.

In particular, the intermediate section 30 supports a hinge pin 31, which is received in the cylindrical seat 22 of the base 20.

The hinge pin 31 allows at the same time the oscillation of the intermediate section 30 with respect to base 20 about the axis of rotation A.

The intermediate section 30 is adapted in practice to be oscillated relative to the base alternately between an alignment configuration, in which the axis of the inner cavity 21 of the base 20 coincides with the central axis of the intermediate section 30, and a misalignment configuration, in which the axis of the inner cavity 21 of the base 20 coincides with the central axis of the intermediate section 30, for example by an acute angle, for example between −20° and +40° (indicating as positive the angles tilted towards the driver) with respect to the alignment configuration, preferably between 0° and 30° or between −15° and +30°, or otherwise configurable according to the requirements.

The intermediate section 30, for example, comprises a second lug 32, for example protruding in a direction substantially radial outside of the same intermediate section in a position in squareness with the hinge pin 31 (received into the cylindrical seat 22).

The second lug 32 is substantially superimposed on the first lug 23 along a plane orthogonal to the cylindrical seat 22 and passing through the axis of the inner cavity 21.

The steering column 10 includes a mutual rotation locking assembly between the intermediate section 30 and the base 20 relative to the axis of rotation A.

In particular, between the intermediate section 30 and the base 20, a gas spring 40 (defining this locking assembly) is interposed, which is configured to exert an elastic thrust between the intermediate section 30 and the base 20, for example directed towards the alignment configuration of the same.

The gas spring 40 comprises a cylinder 41 hinged to the base 20, for example in correspondence of the first lug 23.

Furthermore, the gas spring 40 comprises a stem 42 slidably inserted in the cylinder 41 and hinged to the intermediate section 30, for example in correspondence of the second lug 32.

The stem 42 supports a piston (not visible in the figures) placed inside the cylinder 41 for the pneumatic actuation, by a fluid, for example a (compressible) gas, of the stem 42 from a retracted configuration to an extracted configuration from the cylinder 41.

The gas spring 40 comprises a control element 43, for example placed in correspondence of the stem 42, preferably at its distal end from the cylinder 41, which is selectively operable between a stop position (raised), in which it stops the sliding of the stem 42 in a determined axial position (interposed between the retracted configuration and the extracted configuration, included) with respect to the cylinder 41, and an unlocked position (lowered), in which it releases the sliding of the stem 42 relative to the cylinder 41.

The control element 43 comprises for example a lever, for example of throttling type, rotatably coupled to the stem 42 and operable in rotation by a predetermined angle for the transition from the stop position to the unlocked position.

The intermediate section 30 also comprises a third lug 33, for example protruding in a direction substantially radial outside of the same intermediate section in a position in squareness with the hinge pin 31.

The third lug 33 includes an elongated body 330 in the axial direction with respect to the intermediate section 30 and extends in the opposite direction to the base 20 beyond the intermediate section 30 of a projecting section of given length, for example greater than the axial length of the intermediate section itself.

The third lug 33, for example in correspondence of the elongated body 330, includes an elongated through slot 331 with longitudinal axis parallel to the axis of the intermediate body 30.

The through slot 331 has for example a specific length substantially comprised between 10 mm and 80 mm, preferably equal to 70 mm or in any case partly sized according to the requirements.

The steering column 10 also comprises an upper section 50, which is connected to the intermediate section 30, for example in a sliding manner with respect to a direction of sliding parallel to the axis of the intermediate section 30 itself.

The upper section 50 comprises for example a cylindrical body, for example, also hollow (provided with a cylindrical inner cavity), which is connected coaxially to the intermediate section 30.

The upper section 50 and the intermediate section 30, for example, define a telescopic connection, for example prismatic, defining an additional degree of freedom between the upper section 50 and the intermediate section 30 and, therefore, a translational degree of freedom, further compared to the rotational degree of freedom described above of the upper section 50 with respect to the base 20.

For example, the upper section 50 is inserted within the internal cavity of the intermediate section 30.

The upper section 50 comprises a reversible frictional locking assembly which is configured to block in a reversible manner the mutual sliding between the upper section 50 and the intermediate section 30.

For example, the frictional locking assembly comprises a support bracket 51, for example, projecting outside of the upper section 50 itself and fixed to it.

The support bracket 51 includes, for example, a through hole 510, for example facing at least a section of the through slot 331.

The support bracket 51 is adapted to support a drive pin 52, which has a longitudinal axis perpendicular to the axis of the upper section 50.

The drive pin 52 is for example slidably connected to the support bracket 51, for example inserted into the through hole 510.

The drive pin 52 is for example also inserted in the through slot 331 of the intermediate section 30, so as to slide axially along the same, between two end positions (upper and lower) defined by axially opposite walls of the through slot itself, during the sliding of the upper section 50 with respect to the intermediate section 30.

The drive pin 52 is axially divided ideally, so as to present a first end portion protruding from a part of the through hole 510 opposite with respect to the through slot 331, an intermediate portion interposed between the through hole 510 and the through slot 331 and a second end portion protruding from one side of the through slot 331 opposed to the through hole 510.

On the intermediate portion is fitted (slidably in the axial direction of the drive pin 52) a first friction member 54 of the frictional locking assembly, for example, one or more springs, such as cup springs.

The first friction member 54 is substantially axially interposed between the elongated body 330 (surrounding the through slot 331) and a section of the bracket 51 that surrounds the through hole 510.

On the second end portion is fitted (slidably in the axial direction of the drive pin 52) a second friction member 55 of the locking assembly, for example, one or more springs, such as cup springs.

The frictional locking assembly is equipped with a control member selectively operable between a closed position, in which it stops the sliding of the upper section 50 with respect to the intermediate section 30, and an open position, in which it releases the sliding of the upper section 50 relative to the intermediate section 30.

In particular, the control member includes a cylindrical sleeve 53 which is slidably associated with the drive pin 52, which is for example fitted on the first end section of the drive pin 52, with reduced radial clearance. The drive pin 52 is thus movable along an axial direction of sliding of the cylindrical sleeve 53 itself.

The cylindrical sleeve 53 in practice is fixed to the support bracket 51 in correspondence of the through hole 510 and extends axially and radially its dimensions so as to be able to support slidably the drive pin 52.

Furthermore, the control member further comprises a pressure body 56 substantially axially constrained to the drive pin 52, for example fitted on the second end portion; the pressure body comprises for example a disc-like body, which is adapted to press on the second friction member 55 which is then interposed between the pressure body 56 and the elongated body 330 (or the section thereof surrounding the through slot 331).

The pressure body 56 and the cylindrical sleeve 53 are operable towards and away from each other, as will be better described in the following, for the closing, respectively (compression) and opening (release) the first friction member 54 and the second friction member 55.

When the first friction member 54 and the second friction member 55 are in the closed position the sliding of the upper section 50 with respect to the intermediate section 30 it is arrested by friction between the first friction member 54 and the elongated body 330 and between the second friction member 55 and the elongated body 330.

When the first friction member 54 and the second friction member 55 are in the open position, the sliding of the upper section 50 with respect to the intermediate section 30 is allowed by a drop of a predetermined, settable friction value between the first friction member 54 and the elongated body 330 and between the second friction member 55 and the elongated body 330.

When the first friction member 54 and the second friction member 55 are in the open position, the friction between the first friction member 54 and the elongated body 330 and between the second friction member 55 and the elongated body 330 may be substantially not null, i.e. may be determined in such a way as to prevent the spontaneous sliding of the upper body 50 with respect to the intermediate body 30.

In practice, the mutual distance between the pressure body 56 and the cylindrical sleeve 53 in the open position is dimensioned in such a way that, in this open position, the friction between the first friction member 54 and the elongated body 330 and between the second friction member 55 and the elongated body 330 is substantially not null, i.e. is determined in such a way as to prevent the spontaneous sliding of the upper body 50 relative to the intermediate body 30.

The drive pin 52, in correspondence of its first section protruding from the cylindrical sleeve 53, comprises a further pin 57, for example, in squareness with respect to the longitudinal axis of the drive pin 52 (parallel to the longitudinal axis of the upper section 50).

The steering column 10 includes an actuation lever 60 connected to the upper section 30 which is operable between a locked position, in which the actuation lever is in stable equilibrium and binds both degrees of freedom of the upper section 50 relative to the base 20, in particular the degree of translational freedom between the upper section 50 and the intermediate section 30 and the rotational degree of freedom between the intermediate section 30 and the base 20, and two distinct unlocked positions, in each of which it releases respectively one of the two degrees of freedom of the upper section 50 relative to the base 20.

The actuation lever 60 is for example arranged to operate on the drive pin 52, as will be better described in the following.

In particular, the actuation lever 60 is hinged to the drive pin 52 with respect to a first axis of oscillation B orthogonal to the longitudinal (revolution) axis of the drive pin 52.

For example, the actuation lever 60 is hinged to the drive pin 52 by means of the additional pin 57.

The actuation lever 60 comprises, at the end connected to the drive pin 52, a cam 61 provided with an eccentric profile relative to the first axis of oscillation B.

The cam 61, for example, has an enlarged area located at a certain angle, for example substantially at right angles, with respect to the first axis of oscillation B from a substantially tapered area.

The cam 61 is designed to come into contact selectively, with its enlarged area or its tapered area, with the cylindrical sleeve 53 (i.e. its distal face from the first friction member 54), during an oscillation of a given angle (equal to the angle that separates the tapered region from the enlarged area of the cam 61) of the actuation lever 60 with respect to the first axis of oscillation B.

Advantageously, the actuation lever 60 is connected to the control member (for example to the cylindrical sleeve 53 and the pressure body 56) for the actuation in mutual sliding between the cylindrical sleeve 53 and the pressure body 56, selectively between the closed position and the open position, respectively in the locked position of the actuation lever 60, in which the enlarged area of the cam 61 contacts the cylindrical sleeve 53 and presses it by pulling a result of the pressure body 56 in the approach to the cylindrical sleeve 53 (in the closed position of the control mechanism), and in a first unlocked position of the actuation lever 60, in which (having rotated with respect to the first axis of oscillation B) the tapered region of the cam 61 comes into contact with the cylindrical sleeve 53 and leaves the pressure body 56 free to slide, for effect of the elastic force of the first friction member 54 and the second friction member 55, away from the cylindrical sleeve 53 (in the open position of the control member).

The tapered area of the cam 61 has a profile substantially complementary to the profile of the section of the cylindrical sleeve 53 with which it comes into contact, for example substantially planar, so that the actuation lever 60, in its first unlocked position, is in a position of stable equilibrium, i.e. remains securely in that position if unstressed.

The spontaneous movement of the actuation lever 60 in this first unlocked position is also prevented by the residual friction between the first friction member 54 and the elongated body 330 and between the second friction member 55 and the elongated body 330 in the open position.

In practice, by operating the actuation lever 60 from the locked position to the first unlocked position (making it oscillate with respect to the first axis of oscillation B of the predetermined angle) moves from the closed position to the open position of the frictional locking assembly and, then, the degree of translational freedom of the upper section 50 with respect to base 20 is released.

The drive pin 52 (and/or the actuation lever 60) includes an eccentric section 58 (eccentric with respect to the longitudinal central axis of the drive pin 52 itself), which for example is defined by a small lever keyed on the drive pin 52 and protruding radially therefrom, for example in a radial direction.

The eccentric section 58 is for example fixed (axially and in rotation) to the second end section of the drive pin 52, for example on the outside of the pressure body 56.

The eccentric section 58 is for instance superimposed in plan view (from a distance) to a flap 511 of the support bracket 51.

Both the eccentric section 58 and the flap 511 have for example a respective through and open hole, substantially laterally aligned with each other.

The actuation lever 60, being connected through the further pin 57, to the drive pin 52, is rotatably connected to the upper section 50 with respect to a second axis of oscillation C coinciding with the longitudinal central axis of the drive pin 52, which can rotate within the through hole 510.

A swinging of the actuation lever 60 and, thus, of the eccentric section 58, with respect to the second axis of oscillation C (in a direction of rotation or the other) is such as to selectively remove and bring the eccentric section 58 from the flap 511.

The eccentric section 58 is connected via a traction cable 59, for example a sheathed cable of the Bowden type, to the control element 43 of the gas spring 40 for the actuation of the same control element 43 selectively between its stop position and its unlocked position, as a result of an oscillation of the eccentric section 58 compared to the second axis of oscillation C of a given set angle of oscillation.

In particular, the sheath of the sheathed traction cable 59 is fixed at opposite ends to the flap 511 (in correspondence of the through hole opened in the same sideways) and to a fixed bracket associated to the below of the control element 43 of the gas spring 40 and the cable of the sheathed traction cable 59 is fixed at opposite ends to the eccentric section 58

(in correspondence with the through hole open sideways thereof) and to the control element 43 of the gas spring 40.

The unlocking of the constraint to the rotation of the intermediate section 30 (or the upper section 50) with respect to the base 20 about the axis of rotation A can be realized as follows.

A rotation of the actuation lever 60 relative to the second axis of oscillation C between the locked position and a second unlocked position, in which it is rotated by an angle (for example, acute), for example downwards, causes a mutual spacing between the eccentric section 58 with respect to the flap 511.

In particular, the traction cable of the sheathed cable 59 is placed in tension and the control member 43 of the gas spring 40 is brought from the stop position to the unlocked position, unlocking the drive spring 43 which will thus allow the adjustment of tilting, relative to the axis of rotation A, of the intermediate section 30 (and therefore the upper section 50) relative to the base 20 against the action of the control spring 43.

The actuation lever 60, in its second unlocked position, is in a position of stable equilibrium, i.e. remains securely in that position if unstressed.

In practice, the spontaneous rotation of the actuation lever 60 in that first unlocked position is prevented by the friction between the first friction member 54 and the elongated body 330 and between the second friction member 55 and the elongated body 330, both when they are in closed position and when they are in open position.

In fact, by operating the actuation lever 60 from the locked position to the second unlocked position (making it oscillate with respect to the second axis of oscillation C of the predetermined angle) moves from the stop position to the unlocked position of the control element 43 of the gas spring 40 and, therefore, the rotational degree of freedom of the upper section 50 with respect to base 20 is released.

The block of the constraint to the oscillation of the intermediate section 30 (or the upper segment 50) with respect to the base 20 about the axis of rotation A can be achieved by actuating the reverse rotation of the actuation lever 60 relative to the second axis of oscillation C from the second unlocked position to the locked position, causing a mutual approach between the eccentric section 58 with respect to the flap 511 and, therefore, the release of the control element 43 of the gas spring 40. For example, the actuation lever 60 may include a first surface (flat), for example in correspondence with its distal end from the first axis of oscillation B, substantially parallel to the same first axis of oscillation B.

This first surface is adapted to be contacted by a driver of the vehicle for actuating the oscillation of the actuation lever 60 with respect to the first axis of oscillation B between the locked position and the first unlocked position.

For example, the actuation lever 60 may include a second surface (flat), for example at a distal end thereof from the second axis of oscillation C, substantially parallel to the second axis of oscillation C itself.

This second surface is adapted to be contacted by a driver of the vehicle for actuating the oscillation of the actuation lever 60 with respect to the second axis of oscillation C between the locked position and the second unlocked position.

The steering column 10 also includes a steering axis 70, which is contained within the upper section 50, the intermediate section 30 and the base 20, for example inserted loosely inside the respective internal cavities and supported in rotation with respect to them by suitable rolling members, such as bearings, for example radial (ball) bearings.

In particular, the steering axis 70 comprises a lower axis 71, which is inserted (locked axially) coaxially within the internal cavity of the base 20 and is rotatable relative to an axis of rotation coaxial to it (locked axially).

A lower end (for example projecting downwards from the base 20) of the lower axis 71, for example grooved, can be connected to a motion transmission group to a steering axle of the vehicle, preferably a hydrostatic steering assembly (hydrostatic power steering).

The steering axis 70 further comprises an intermediate axis 72, which is inserted (locked axially) coaxially within the internal cavity of the intermediate section 30 and is rotatable relative to an axis of rotation coaxial to it.

The intermediate axis 72 and the lower axis 71 are mutually connected by a joint 73, for example a universal joint, which allows the transfer of rotary motion from the intermediate axis 72 to the lower axis 71 also as a result of a tilting of the intermediate section 30 with respect to base 20 about the axis of rotation A.

The steering axis 70 then comprises an upper axis 74, which is inserted (locked axially) coaxially within the internal cavity of the upper section 50 and is rotatable with respect to an axis of rotation coaxial to it.

The upper axis 74 is slidingly connected, for example in a telescopic manner, to the intermediate axis 72, for example dragged in sliding by the sliding of the upper section 50 with respect to the intermediate section 30.

An upper end (for example protruding upwards from the upper section 50) of the upper axis 74 is connectable, for example rigidly, to a steering wheel, to drive in rotation the steering axis 70 with respect to the upper section 50, the intermediate section 30 and the base 20 for steering the vehicle.

The invention thus conceived is susceptible to numerous modifications and variations, all falling within the inventive concept.

Further, all the details can be replaced by other technically equivalent elements.

In practice, the materials employed, as well as the shapes and the dimensions, may be any according to requirements without thereby abandoning the scope of protection of the following claims.

The invention claimed is:

1. A steering column (10), comprising:
   a base (20);
   an upper section (50) connected to the base (20), wherein the upper section (50) is movable relative to the base (20) with respect to at least two degrees of freedom;
   an actuation lever (60) connected to the upper section (50) and operable between a locked position, in which the actuation lever (60) is in stable equilibrium and constrains both degrees of freedom of the upper section (50) relative to the base (20), and two distinct unlocked positions, each of which respectively releases one of the two degrees of freedom of the upper section (50) relative to the base (20);
   wherein, in the two unlocked positions, the actuation lever (60) is located in two distinct respective stable equilibrium positions;
   wherein, between the base (20) and the upper section (50), an intermediate section (30) can be interposed, the upper section (50) is slidably connected to the intermediate section (30) defining a degree of translational freedom of the upper section (50) relative to the base (20);

wherein, between the upper section (50) and the intermediate section (30) a frictional locking assembly (54, 55) is interposed, equipped with a control member (53, 56) selectively operable between a closed position, in which it stops the sliding of the upper section (50) with respect to the intermediate section (30), and an open position, in which it releases the sliding of the upper section (50) relative to the intermediate section (30);

wherein the actuation lever (60) can be connected to the control member (53, 56) for the actuation of the same selectively between the closed position and the open position, respectively in the locked position of the actuation lever (60) and in a first position of the two unlocked positions of the same;

and wherein the actuation lever (60) is rotatably connected to the upper section (50) with respect to a first axis of oscillation (B) and comprise a cam (61) with an eccentric profile relative to the first axis of oscillation (B) and adapted to actuate the control member (53, 56) selectively between the closed position and the open position as a result of an oscillation of the cam (61) with respect to the first axis of oscillation (B) of a given angle of oscillation.

2. Steering column (10) according to claim 1, wherein, between the base (20) and the upper section (50), an intermediate section (30) can be interposed, the intermediate section (30) is slidably connected to the base (20) defining a degree of translational freedom of the upper section (50) relative to the base (20).

3. Steering column (10) according to claim 1, wherein the intermediate section (30) is slidably connected to the base (20) defining a degree of translational freedom of the upper section (50) relative to the base (20) and in which the intermediate section (30) is hinged to the base (20) with respect to an axis of rotation (A) perpendicular to a direction of sliding of the upper section (50) with respect to the intermediate section (30).

4. Steering column (10) according to claim 2, wherein a gas spring (40) is interposed between the intermediate section (30) and the base (20), comprising:
- a cylinder (41), hinged to one of the base (20) and the intermediate section (30);
- a stem (42) slidably connected to the cylinder (41) and hinged to the other of the intermediate section (30) and the base (20); and
- a control element (43) selectively operable between a stop position, in which it stops the sliding of the stem (42) relative to the cylinder (41), and an unlocked position, in which it releases the sliding of the stem (42) relative to the cylinder (41);

and wherein the actuation lever (60) can be connected to the control element (43) for the selective actuation of the same between the stop position and the unlocked position, respectively in the locked position of the actuation lever (60) and in a second position of the two unlocked positions of the same.

5. Steering column (10) according to claim 4, wherein the actuation lever (60) may be rotatably connected to the upper section (50) with respect to a second axis of oscillation (C) and comprise at least an eccentric section (58) eccentric with respect to the second axis of oscillation to which the control element (43) is connected by a traction cable (59), for the actuation of the control element (43) selectively between the stop position and the unlocked position as a result of an oscillation of the eccentric section (58) with respect to the second axis of oscillation (C) of a given angle of oscillation.

6. Steering column (10) according to claim 5, in which the traction cable (59) comprises a sheathed Bowden type cable.

* * * * *